(12) United States Patent
Fertner et al.

(10) Patent No.: US 9,009,017 B2
(45) Date of Patent: Apr. 14, 2015

(54) ARRANGEMENT AND METHOD RELATING TO ANALYSIS OF TRANSMISSION LINES

(75) Inventors: Antoni Fertner, Stockholm (SE); Fredrik Lindqvist, Järfälla (SE); Ioanna Pappa, Stockholm (SE); Klas Ericson, Älvsjö (SE); Miguel Berg, Upplands Väsby (SE); Per Ola Börjesson, Lund (SE); Stefan Höst, Svedala (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 333 days.

(21) Appl. No.: 13/504,993

(22) PCT Filed: Jan. 8, 2010

(86) PCT No.: PCT/SE2010/050015
§ 371 (c)(1),
(2), (4) Date: Apr. 30, 2012

(87) PCT Pub. No.: WO2011/053212
PCT Pub. Date: May 5, 2011

(65) Prior Publication Data
US 2012/0215503 A1 Aug. 23, 2012

Related U.S. Application Data

(60) Provisional application No. 61/256,451, filed on Oct. 30, 2009.

(51) Int. Cl.
*G06F 17/50* (2006.01)
*H04M 3/26* (2006.01)

(52) U.S. Cl.
CPC ...... *H04B 3/466* (2013.01); *H04M 3/26* (2013.01)

(58) Field of Classification Search
CPC ............ G02B 27/48; G02B 6/42; G06K 7/10; G06K 9/26; G06K 9/325; G06K 7/14; H01S 5/005; H01S 3/00; H04L 9/00; H04L 12/56; G06F 9/44; G06F 17/30; G06F 7/00; G06F 17/27; G06F 15/16; G06F 9/45; G06F 15/173; G06F 3/048; G06F 9/46; G06F 9/00; G06F 17/50; G06F 19/00; G06F 17/00; G06F 3/01; G06F 9/455; G06F 15/177; G06F 3/00; G06F 17/21; G06F 11/00; G06Q 10/00; G06Q 50/00; H04W 4/14; G06C 11/08

USPC .......... 703/13, 21; 702/4, 65; 379/417, 22.02, 379/377; 324/533, 758, 756.01
See application file for complete search history.

(56) References Cited

U.S. PATENT DOCUMENTS 5,983,162 A * 11/1999 Huang .............................. 702/4
2002/0172329 A1* 11/2002 Rashid-Farrokhi et al. ......................... 379/22.02

(Continued)

FOREIGN PATENT DOCUMENTS

WO    WO 2004/091105 A2    10/2004
WO    WO 2004/099711 A1    11/2004

(Continued)

OTHER PUBLICATIONS

Linddqvist, et al.: "Low-order and Casual Twisted-Pair Cable Modeling by Means of the Hilbert Transform". Department of Electrical and Information Technology, Lund University, Sweden, Jun. 2008.

(Continued)

*Primary Examiner* — Kandasamy Thangavelu

(57) ABSTRACT

Embodiments of the present invention relate to an arrangement for analyzing transmission line properties. Measurement data providing means provide data of a first frequency dependent line property, line property calculation arrangement with model handling means, a Hubert transform handler and line property determination means calculate said first property based on model parameters, line resistance at 0 frequency, $r_{oc}$, a cut-off frequency, v, a line capacitance $C_\infty$ and a line inductance $L_\infty^H$. The line model handling means calculates the line inductance $L(f)$ via a Hubert transform of a function of $Q(f/v)$, wherein the function $Q(f/v)$ relates the line resistance $R(f)$ to $r_{oc}$ as $R(f)=r_{oc} \cdot Q(f/v)$. The Hilbert transform values are calculated using a parameterized closed form expression for the Hubert transform or they are tabulated. The line property determination means calculates the first property and criteria function application means uses the measured first property and the calculated first property for model parameters to find optimized numerical model parameter values.

21 Claims, 12 Drawing Sheets

(56) References Cited

U.S. PATENT DOCUMENTS

| | | | |
|---|---|---|---|
| 2003/0002658 A1* | 1/2003 | Belge et al. | 379/377 |
| 2003/0099350 A1* | 5/2003 | Bostoen et al. | 379/417 |
| 2009/0024340 A1* | 1/2009 | Borjesson et al. | 702/65 |
| 2010/0188095 A1* | 7/2010 | Maslen | 324/533 |
| 2010/0277197 A1* | 11/2010 | Deutsch et al. | 324/758 |
| 2011/0001504 A1* | 1/2011 | Cho et al. | 324/756.01 |

FOREIGN PATENT DOCUMENTS

| | | |
|---|---|---|
| WO | WO 2007/050001 A1 | 1/2007 |
| WO | WO 2007/089173 A1 | 8/2007 |
| WO | WO 2009/131501 A1 | 10/2009 |

OTHER PUBLICATIONS

Boets, et al.: "Metallic 2-Wire Parametric Line Models—a Survey". XVIII World Congress. Sep. 17-22, 2006. Rio de Janeiro, Brazil.

Van Den Brink: "Cable Reference models for simulating metallic access networks". ETSI STC TM6. Jun. 1998.

Musson, Joe: "Maximum Likelihood Estimation of the Primary Parameters of Twisted Pair Cables". ETSI STC TM6 meeting Jan. 26-30, 1998. Madrid, Spain.

Boets, et al.: "On the Identification of Cables for Metallic Acces Networks". May 21-23, 2001. Budapest, Hungary.

Bostoen, et al.: "Estimation of the Transfer Function of a Subscriber Loop by Means of a One-Port Scattering Parameter Measurement at the Central Office". Jun. 2002.

ITU-T G.996.1: "Test Procedures for digital subscriber line (DSL) transceivers". Feb. 2001.

Heylen, et al.:"Cable Models Predict Physically Impossible Behaviour in Time Domain". European Telecommunications Standards Institute. ETSI TM6—Plenary #16. 1999. Amsterdamn.

Kerpez, et al.: "Single-Ended Loop Make-up Identification—Part I: A Method of Analyzing TDR Measurements". Apr. 2006.

Kerpez, et al.: "Single-Ended Loop-Makeup Identification—Part II: Improved Algorithms and Performance Results." Apr. 2006.

\* cited by examiner

ARRANGEMENT AND METHOD RELATING TO ANALYSIS OF TRANSMISSION LINES

CLAIM OF PRIORITY

This application is a 371 of PCT/SE10/50015, filed on Jan. 8, 2010, which claims the benefit of U.S. Provisional Application No. 61/256,451, filed Oct. 30, 2009, the disclosures of which are fully incorporated herein by reference.

BACKGROUND

The present invention relates to an arrangement and to a method for investigation, analysis or prediction of a property of a transmission line. The transmission line may include a number of cable segments. The invention also relates to a transmission line representation model and the set-up, establishment, and use thereof.

STATE OF THE ART

Within telecommunications it is becoming more and more widespread and attractive to offer xDSL, i.e. high speed DSL (Digital Subscriber Line) access, to large as well as to small companies and home subscribers. This means that loops and cables, often copper wires, have to be in a state such as to allow that. Therefore advanced loop qualification systems are needed which can detect or minimize qualification errors. Loop qualification actually comprises determination as to whether a loop or a cable is capable of supporting DSL services or not. Estimation of the achievable channel capacity in xDSL transmission e.g. using so called single-ended loop testing (SELT) is a technique which DSL operators often utilize. It is advantageous because it requires only measurements from one end of a copper line to determine accurately its performance. The loop introduces frequency dependent attenuation, insertion losses and phase shift etc. between transmitter and receiver. In addition thereto the attenuation is dependent on the type of cable and on the length of the cable. Sometimes the attenuation is roughly estimated based on cable length estimate and an assumed average attenuation per unit length.

Using SELT, an xDSL modem can report single-ended measurements before activation of DSL services or in order to analyze DSL lines that do not work. However, also other testing techniques can be used and the inventive concept is not limited to SELT applications.

Generally there is a growing demand to model and predict the behavior of telecommunication lines in the access network used by Digital Subscriber Line (DSL) systems, especially for the newly introduced VDSL2 systems.

Therefore, it is essential that used cable models are representative for the real world transmission lines. In particular the transmission properties at very high frequencies, e.g. at VDSL2 frequencies, have to be adequately modeled for correct estimation of the transmission capacity.

Cable models representing the twisted-pair copper lines in the European access networks are standardized by ETSI, European Telecommunication Standard Institute. These models are widely used to compare the performance of DSL transceivers from different vendors and to specify requirements for DSL systems. They are based on the so called BT0 cable model and constitute the norm for DSL cable modelling. However, the BT0 model has a non-physical behaviour in the time domain since it violates the law of causality. The lack of causality of the BT0 model corresponds in the frequency domain to violating the Hilbert transform-relation between the real and the imaginary part of the serial impedance.

In "Low-Order and Causal Twisted-Pair Cable Modelling by Means of the Hilbert Transform" by Fredrik Lindqvist et. al., The twentieth Nordic Conference on Radio Science and Communication, Jun. 9-11, 2008, AIP Conference Proceeding, Vol. 1106, pages 301-310, the necessary requirements for a general frequency-dependent impedance to comply with the causal conditions stated by the Hilbert transform are analyzed. The basic form of the Hilbert transform is extended and a new twisted-pair cable model, denoted $BT0_H$, that is both causal and has fewer parameters than the standardized BT0 model is suggested. The reduction of model order is made possible by relating the real part to the imaginary part of the serial impedance via the Hilbert transform. In other words, unlike BT0, the $BT0_H$ model does not treat the serial resistance and the serial inductance as mutually independent.

The merit of low order is important for described DSL line qualification methods where the transfer function of a multi-section line is estimated with model-based optimization. The criteria functions used in this type of applications typically have many local optima. Hence, it has been suggested to employ a parameterized cable model of low order to decrease the search space dimension and thereby reduce the complexity of finding the global optimum.

Disadvantages of the British Telecom (BT) models (BT0 and BT1) are that they are non-causal, meaning that the impulse response of the model does not solely depend on current and past input values, but also on future values. This leads to an unwanted behavior in the time domain. WO 2007/089173 proposes a numerical solution to the problem of calculating a cable model. However, this solution, at least in some applications, demands an amount of computer processing that is somewhat unsatisfactory.

SUMMARY

It is therefore an object of the present invention to propose an improved cable or transmission line model. It is particularly an object of the invention to provide a less complex, improved cable model which is causal and of a low order.

It is also an object of the invention to provide an improved arrangement and method respectively for transmission line investigation or analysis, particularly having a lower complexity than known solutions, which is reliable, simple, easy to implement and which requires less computational power. It is a particular object to provide a solution through which cumbersome numerical applications or calculations can be reduced or to a large extent avoided.

Another object is to estimate the line inductance (L(f)) of a transmission line via a Hilbert transform or a relation between line inductance and line resistance.

Another object is to estimate an expression involving the line inductance.

Therefore an arrangement for transmission line investigation is provided which comprises a measurement data providing means for providing measurement data of a first time or frequency dependent property of a transmission line, a transmission line property calculation arrangement, which comprises a transmission line model handling means providing a transmission line model, a Hilbert transform handler and line property determination means, and which is arranged to provide a calculation of the said first property based on a number of model parameters. The model parameters comprise or are related to at least two of the line resistance at 0 frequency, $r_{oc}$, a cut-off frequency, v, a line capacitance, $C_\infty$, and a line inductance, $L_\infty^H$, or one or more relationships therebetween. The line model handling means are adapted to calculate the transmission line inductance L(f) or an expression involving the line inductance via a Hilbert transform of Q(f/v) wherein Q(f/v) is a function that relates the line resistance R(f) to $r_{oc}$, R(f)=$r_{oc}$·Q(f/v), the Hilbert transform of Q(f/v) reading $$\Lambda\left(\frac{f}{v}\right) = -\frac{1}{\pi} \cdot \int_{-\infty}^{\infty} \frac{\sqrt[4]{1+\left(\frac{x}{v}\right)^2}}{f-x} dx.$$

The Hilbert transform values are calculated using an analytical closed form expression which in one embodiment reads $$\frac{f}{v} \frac{I_0}{\sqrt[4]{1+\left(\frac{f \cdot I_0^2}{v}\right)^2}}$$

wherein $I_0$ is a constant, or alternatively values of the Hilbert transform are tabulated or calculated by a polynomial in log f/v. For model parameter values calculated by means of the line model handling means in communication with the Hilbert transform handler, the line property determination means are adapted to calculate the first property. Criteria function application means are in communication with the line property determination means and the measurement data providing means are arranged to, using the measured first property and the calculated first property for a given set of model parameters, to find optimized numerical model parameter values for which one or more given criteria for at least one given transmission line are met.

Information on various ways of implementing a process of finding optimal model parameters can be found in "Estimation of Line Properties in the Copper Access Network", Fredrik Lindqvist, thesis for the degree of Licentiate in Engineering Lund University, Department of Electrical and Information Technology March 2009, particularly in paper II of the thesis, and also in K. Kerpetz and S. Galli: "Single-Ended Loop Make-Up Identification", Part I & II in IEEE Transactions on Instrumentation and Measurement, vol. 55, no. 2, pp. 528-537 and pp. 538-549 April 2006. Other useful methods may be e.g. genetic algorithms, simulated annealing, gaussian adaptation.

A method through which one or more of the above mentioned drawbacks are overcome is also proposed, which comprises the steps of: acquiring measurement data relating to a first frequency or time dependent property of a transmission line; expressing the measured quantity using a causal model as a function of a number of model parameters; finding optimized numerical values of the model parameters or the relationships therebetween based on one or more given criteria. The model parameters, comprise one or more parameters, or relationships therebetween, related to the line impedance, e.g. the line resistance at 0 frequency, $r_{oc}$; a cut-off frequency, v; a line capacitance, $C_\infty$; a line inductance $L_\infty^H$; the calculation of a transmission line property comprises; calculating the transmission line inductance L(f), or an expression involving the inductance, via a Hilbert transform, $$\Lambda\left(\frac{f}{v}\right) = -\frac{1}{\pi} \cdot \int_{-\infty}^{\infty} \frac{\sqrt[4]{1+\left(\frac{x}{v}\right)^2}}{f-x} dx'$$

and the values of said Hilbert transform are calculated using an analytical closed-form expression $$\frac{f}{v} \frac{I_0}{\sqrt[4]{1+\left(\frac{f \cdot I_0^2}{v}\right)^2}},$$

for the Hilbert transform, or the values of the Hilbert relation between Q(φ) and Λ(φ), or between line resistance and line inductance, are fetched from a table wherein said values are held in dependence on f/v, by using a polynomial in log f/v.

Still further a cable model is proposed, and a solution through which the parameter values can be found, and particularly such that the relationship between the line resistance and the line inductance can be established. In some applications, line properties can be established by simply putting in information concerning a cable dimension and perform a table look-up to find the relevant parameter values (established by means of the inventive method/arrangement for the model). The model or the relationship can be established, according to the invention, either by means of analytical calculation or by generation of a table corresponding to the Hilbert transform (relation) between Q(φ) and Λ(φ), wherein line resistance $$R(f) = r_{oc} Q\left(\frac{f}{v}\right)$$

and line inductance $$L(f) = \frac{r_{oc}}{2\pi f} \cdot \Lambda\left(\frac{f}{v}\right) + L_\infty^H.$$

Additionally it is suggested a method of computing a parameter φ as f/v where f is a first frequency of interest, and v represents a frequency with the property that for frequencies substantially higher than v, the resistance of a transmission line varies with frequency as essentially the square root of the frequency, and for frequencies substantially lower than v, the resistance of the line is essentially constant, querying with φ as input a one-dimensional representation R which produces as response to the query a value Λ, wherein Λ is an approximation of the Hilbert transform of a function Q which describes the dependence with frequency of the resistance of the transmission line, estimating a transmission property of the transmission line or setting an operational parameter of the transmission line in dependence of Λ. R may be a table lookup function, or a mathematical expression. Most particularly R is $$\varphi I_0 / \sqrt[4]{1+(\varphi I_o^2)^2}.$$

BRIEF DESCRIPTION OF THE DRAWINGS

The invention will in the following be more thoroughly described, in a non-limiting manner, and with reference to the accompanying drawings, in which.

DETAILED DESCRIPTION

Figure 1:
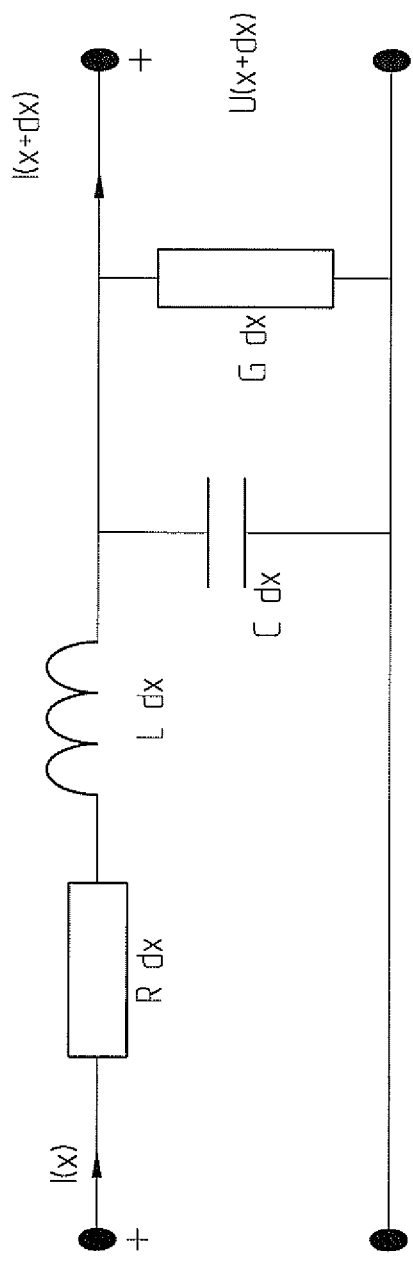
FIG. 1 schematically illustrates an infinitesimal cable section of length dx.

For the understanding of the invention, the Hilbert transform and its generalisation referred to above will be briefly discussed.

A general frequency-dependent (passive) impedance $\tilde{Z}(\omega)=\tilde{R}(\omega)+j\omega\tilde{L}(\omega)$, is considered where $\tilde{R}(\omega)$ and $\tilde{L}(\omega)$ are the resistance and the inductance, respectively, at angular frequency $\omega=2\pi f$. The tilde-sign distinguishes these quantities from the extended impedance used below and $\tilde{z}(t)$ denotes the inverse Fourier transform of $\tilde{Z}(\omega)$. It is assumed that the time domain response $\tilde{z}(t)$ is real-valued and causal. Further it is assumed that both $\tilde{R}(\omega)\to 0$ and $\omega\tilde{L}(\omega)\to 0$ as $\omega\to\infty$. Under these conditions $\tilde{z}(t)$ has no (Dirac) impulses at t=0 and it can be shown by decomposition of $\tilde{z}(t)$ into its even and odd parts that the following relations between $\tilde{R}(\cdot)$ and $\tilde{L}(\cdot)$ hold:

$$\tilde{R}(\omega) = \frac{1}{\pi}\int_{-\infty}^{\infty}\frac{x\tilde{L}(x)}{\omega - x}dx \tag{1}$$

$$\omega\tilde{L}(\omega) = -\frac{1}{\pi}\int_{-\infty}^{\infty}\frac{\tilde{R}(x)}{\omega - x}dx \tag{2}$$

wherein x denotes an integration variable that spans a frequency range.

Equations (1) and (2) are known as the Hilbert transform and assure that $\tilde{z}(t)=0$ for $t<0$. Next (1) and (2) are extended to the slightly more general case where the resistance and the inductance are permitted to approach constant values as $\omega\to\infty$. As will be described below this extension has interesting properties applicable to cable modeling. It is assumed that a constant resistance $\Delta R$ is added to $\tilde{Z}(\omega)$. The new total resistance is denoted $R(\omega)=\tilde{R}(\omega)+\Delta R$. Adding $\Delta R$ to the frequency response corresponds to adding the impulse $\Delta R\delta(t)$ to $\tilde{z}(t)$. Hence, the condition $\tilde{z}(t)=0$ for $t<0$ is still satisfied. Similarly, the constant $j\omega\Delta L$ is added to $\tilde{Z}(\omega)$, which corresponds to the addition $$\Delta L\delta(t) = \Delta L\frac{d\delta(t)}{dt} \text{ to } \tilde{z}(t).$$

Consequently, $\tilde{z}(t)$ remains causal also in this case where the new total inductance is denoted $L(\omega)=\tilde{L}(\omega)+\Delta L$. The first derivative of $\delta(t)$ is defined in the article referred to above where $$\int_{-\infty}^{\infty}\frac{d\delta(t-\tau)}{dt}f(t)dt = -\frac{df(\tau)}{dt},$$

and f(t) is an arbitrary function.

Since the real and the imaginary parts of $Z(\omega)$ correspond to the even and the odd part of its time-domain transform, respectively, Z(t) can be expressed as $$z(t) = z_e(t) + z_o(t) \tag{3}$$
$$= (\tilde{z}_e(t) + \Delta R\delta(t)) + (\tilde{z}_o(t) + \Delta L\delta'(t)),$$

where $\tilde{z}_e(t)$ and $\tilde{z}_o(t)$ are the even and the odd parts of $\tilde{z}(t)$. By introducing the signum-function sgn(t), the even and the odd part of z(t) in (3) can be written as $$z_e(t) = \tilde{z}_o(t)sgn(t) + \Delta R\delta(t) \tag{4}$$

$$z_o(t) = \tilde{z}_e(t)sgn(t) + \Delta R\delta'(t). \tag{5}$$

Hence, the Fourier transform of $z_e(t)$ and $z_o(t)$ yields $$R(\omega) = \frac{1}{2\pi}j\omega\tilde{L}(\omega) * \frac{2}{j\omega} + \Delta R \tag{6}$$

$$j\omega L(\omega) = \frac{1}{2\pi}\tilde{R}(\omega) * \frac{2}{j\omega} + j\omega\Delta L \tag{7}$$

where * is the continuous-time convolution operator. It now follows that the relation between $R(\omega)$ and $L(\omega)$ can be expressed as follows by replacing * with the convolution integral $$R(\omega) = \frac{1}{\pi}\int_{-\infty}^{\infty}\frac{x\tilde{L}(x)}{\omega - x}dx + \Delta R \tag{8}$$

-continued $$\omega L(\omega) = -\frac{1}{\pi} \int_{-\infty}^{\infty} \frac{\tilde{R}(x)}{\omega - x} dx + \omega \Delta L, \quad (9)$$

where $\tilde{R}(\omega) = R(\omega) - \Delta R$ and $\tilde{L}(\omega) = L(\omega) - \Delta L$. Here, $\Delta R$ and $\Delta L$ are chosen such that $\tilde{R}(\omega) \to 0$ and $\omega \tilde{L}(\omega) \to 0$ as $\omega \to \infty$. Thus, by allowing impulses at $t=0$, the Hilbert transform of (1)-(2) has been extended to the slightly more general case. With the assumed conditions we can state the following based on (8)-(9). For a given causal impedance with inductance $L(\omega)$, the total resistance in (8) can only be determined within a constant $\Delta R$. Similarly, given $R(\omega)$ of a causal impedance, the total inductance in (9) can only be determined within a constant $\Delta L$. This uncertainty has implications to cable modeling as described in the following section.

A transmission line, e.g. a twisted-pair cable, is commonly divided into a cascade of infinitesimal homogenous line sections of the length dx, as illustrated in FIG. 1.

Each segment can be treated as a circuit consisting of a serial impedance $Z(\omega) = R(\omega)dx + j\omega L(\omega)dx$ and a shunt admittance $Y(\omega) = G(\omega)dx + j\omega C(\omega)dx$. Here $R(\omega)$, $L(\omega)$, $G(\omega)$, and $C(\omega)$ are the serial resistance, the serial inductance, the shunt conductance, and the shunt capacitance, respectively, which are all frequency-dependent and expressed per unit length. Different parameterized expressions (models) for these quantities can be found, leading to different cable models.

Thus, elements R, L, C and G define the line resistance, the line inductance, the line capacitance, and the line conductance per unit length. They are all, in general, presumed constant with respect to line length but dependent on frequency. The following solution is obtained:

$$\gamma = \sqrt{(R + jwL)(G + jwC)}$$

$$Z_0 = \sqrt{\frac{R + jwL}{G + jwC}}$$

where $\gamma = \alpha + j\beta$ is the complex-valued propagation constant whereas ($\alpha$) stands for attenuation and ($\beta$) for phase delay, and $Z_0$ is characteristic impedance. Under assumption of a perfectly matched source and load impedance, the transfer function yields $$H = e^{-\gamma d},$$

where d is length of the line in unit meter.

The standardized BT0 cable model defines the line resistance and the line inductance as $$R(f) = \sqrt[4]{r_{oc}^4 + a_c f^2} \quad (10)$$

$$L(f) = \frac{L_o + L_\infty \left(\frac{f}{f_m}\right)^b}{1 + \left(\frac{f}{f_m}\right)^b},$$

where $r_{oc}$, $a_c$, $L_o$, $L_\infty$, $f_m$, b all are model parameters. Moreover, BT0 models the line capacitance as constant with regard to frequency and the conductance is set to zero (approximation). The frequency $f = \omega/2\pi$ is used instead of $\omega$ in the previous section. In order to obtain a causal model with fewer model parameters than BT0, the line resistance in R(f) is rewritten as:

$$R(f) = r_{oc} \sqrt[4]{1 + (f/v)^2} = r_{oc} Q(f/v), \quad (12)$$

where the cut-off frequency $$v = \sqrt{\frac{r_{oc}^4}{a_c}}.$$

Furthermore the inductance L(f) is expressed by means of the Hilbert transform as:

$$L(f) = \frac{r_{oc}}{2\pi f} \Lambda(f/v) + L_\infty^{(H)}, \quad (13)$$

where $\Lambda(f/v)$ is the Hilbert transform of $Q(f/v)$ and $L_\infty^{(H)}$ is another cable-dependent parameter that cannot be determined via the Hilbert transform as described earlier. In the reference "Low-Order and Casual Twisted-Pair Cable Model, with the Hilbert Transform implemented as closed-form expression", by Fredrik Lindqvist et al., The twentieth Nordic Conference on Radio Science and Communications, Växjö, Sweden, Jun. 9-11, 2008. AIP Conference Proceeding, vol. 1106, pp 301-310. $R(f) \to 0$ as $f \to \infty$ and the Hilbert integral for calculating $\Lambda(f/v)$ is not absolute-convergent. However, the Cauchy principle value of the integral is convergent and so interpreted. Another consequence of using the Cauchy principle value is that there is no need to subtract $\Delta R$ from $R(\omega)$.

As for the BT0 model it is assumed that the line capacitance, denoted $C_\infty^{(H)}$, is constant with frequency and that the line conductance is zero. Thus, the causal cable model, denoted BT0$_H$, consists of only four cable-dependent parameters represented by $R_0$, v, $L_\infty^{(H)}$, $C_\infty^{(H)}$. This should be compared to the original BT0 model that consists of seven parameters where $G(f) = 0$ and $C(f) = C_\infty$.

According to the present invention the causal, low-order cable model described above, comprises four parameters that are calculated and, in one embodiment represented by an analytical closed-form expression, e.g. instead of a numerical approximation in another, second, embodiment by means of the creation of a table, and in a third embodiment by a polynomial in log f/v.

According to different embodiments a low number of parameters are used, e.g. four. In other embodiments relationships between two or more parameters are used. A few examples are given below.

For example, if $$\eta = \sqrt[4]{1 + \left(\frac{f}{v}\right)^2}$$

$$Z_C = \sqrt{\frac{R + j\omega L}{G + j\omega C}} \approx \sqrt{\frac{R + j\omega L}{j\omega C}}$$

the characteristic impedance of a line can be calculated using (all) four parameters as:

$$R = r_{oc} \cdot \eta$$

$$L = H(R) + L_\infty$$

-continued $$Z_C \approx \sqrt{\frac{R + j\omega L}{j\omega C}};$$

H(•) is ½πf times the Hilbert transform of the function denoted by •, e.g.

$$H(R) = \frac{r_{oc}}{2\pi f} \cdot \Lambda(f/v)$$

as seen in equation (13), or an approximation thereof, e.g. as in equation (18) below (η denotes the same function as Q).

The characteristic impedance of a line can be calculated using a ratio between some parameters (two cases) as:

a) a ratio between primary parameters:

$$Q_{RC} = \frac{R}{C} = \frac{r_{oc}}{C} \cdot \eta$$

$$Q_{LC} = \frac{L}{C} = \frac{H(R) + L_\infty}{C} = H\left(\frac{R}{C}\right) + L_\infty = H(Q_{RC}) + \frac{L_\infty}{C}$$

$$Z_C \approx \sqrt{\frac{R + j\omega L}{j\omega C}} = \sqrt{\frac{R}{j\omega C} + \frac{L}{C}} = \sqrt{\frac{Q_{RC}}{j\omega} + Q_{LC}}$$

or b) as a ratio between model parameters:

$$Q_{RC} = \frac{r_{oc}}{C}$$

$$Q_{LC} = \frac{L_\infty}{C}$$

$$Z_C \approx \sqrt{\frac{R + j\omega L}{j\omega C}} = \sqrt{\frac{R}{j\omega C} + \frac{L}{C}} =$$

$$\sqrt{\frac{r_{oc} \cdot \eta}{j\omega C} + \frac{H(r_{oc} \cdot \eta)}{C} + \frac{L_\infty}{C}} = \sqrt{\frac{Q_{RC} \cdot \eta}{j\omega} + H(Q_{RC} \cdot \eta) + Q_{LC}}$$

Still further the propagation constant of a line can be calculated using a product between some parameters (two cases) e.g. as:

c) a product of primary parameters:

$$P_{RC} = RC = r_{oc} C \cdot \eta$$

$$P_{LC} = LC = (H(R) + L_\infty) \cdot C = H(RC) + L_\infty C = H(P_{RC}) + L_\infty C$$

$$\Gamma = \sqrt{(R + j\omega L)(G + j\omega C)} \approx \sqrt{(R + j\omega L)j\omega C} =$$

$$\sqrt{j\omega RC - \omega^2 LC} = \sqrt{j\omega P_{RC} - \omega^2 P_{LC}}$$

or d) as a product of model parameters:

$$P_{RC} = r_{oc} C$$

$$P_{LC} = L_\infty C$$

$$\Gamma = \sqrt{(R+j\omega L)(G+j\omega C)} \approx \sqrt{(R+j\omega L)j\omega C} =$$
$$\sqrt{j\omega RC - \omega^2 C(H(R) + L_\infty)} = \ldots$$
$$\sqrt{j\omega R_0 \eta C - \omega^2 (H(R_0 \eta)C + L_\infty C)} =$$
$$\sqrt{j\omega P_{RC} \eta - \omega^2 (H(P_{RC}\eta) + P_{LC})}$$

Still further relationships between one or more of said parameters may be used and calculated, e.g. L(f)/C(f), L·R, L·C etc, i.e. products or quotients of the model parameters.

Hence, a line property which depends on a relationship between model parameters, as in the examples above, may be measured, and optimized values of said relationships may be determined instead of optimized values of the model parameters themselves. E.g. if Zc is measured, optimized values of $r_{oc}/C$, and $L_\infty/C$ may be determined, instead of R, $L_\infty$ and C themselves.

As referred to earlier in the application, $$\Lambda\left(\frac{f}{v}\right)$$

is the Hilbert transform of $$Q\left(\frac{f}{v}\right),$$

i.e., $$\Lambda\left(\frac{f}{v}\right) = -\frac{1}{\pi} \cdot \int_{-\infty}^{\infty} \frac{\sqrt[4]{1 + \left(\frac{x}{v}\right)^2}}{f - x} dx. \tag{14}$$

As also referred to above, $L_\infty^H(f)$ is a cable-dependent parameter that cannot be determined via the Hilbert transform.

The Hilbert integral in (14) is not absolute-convergent. However, the Cauchy principle value of the integral is convergent and the integral can be so interpreted.

It should be noted that the proposed cable model, designated as $BT0_H$, is casual and consists of only four parameters: $r_{oc}$, v, $L_\infty^H$, and $C_\infty$ (or relationships between one or more thereof, e.g. quotients or products as discussed above).

In equation (12) and (14) above the functions Q(•) and Λ(•) are both expressed in terms of normalized frequencies. Hence, for φ=f/v, equation (14) can be written as:

$$\Lambda(\varphi) = -\frac{1}{\pi} \cdot \int_{-\infty}^{\infty} \frac{Q(\vartheta)}{\varphi - \vartheta} d\vartheta \tag{15}$$

Applying the Cauchy principal value method to (15), which would otherwise be undefined, the following is obtained:

$$\Lambda(\varphi) = \frac{1}{\pi} \int_{0^+}^{\infty} \frac{Q(\varphi + \vartheta) - Q(\varphi - \vartheta)}{\vartheta} d\vartheta \tag{16}$$

It is not straightforward to make a variable change so that this integral can be derived as a finite integral with a finite integrand. However, according to one embodiment, a variable change is performed as follows:

$$\Lambda(\varphi) = \frac{1}{\pi} \int_{0^+}^{1^-} \frac{1+x}{x(1-x)} \cdot \left( Q\left(\varphi + \frac{x}{(1-x)^2}\right) - Q\left(\varphi - \frac{x}{(1-x)^2}\right) \right) dx \quad (17)$$

According to another embodiment, an alternative variable change can be done giving the following:

$$\Lambda(\varphi) = \frac{1}{\pi} \int_{0^+}^{1^-} \frac{2(1+x)}{x(1-x)} \left( Q\left(\varphi + \frac{x^2}{(1-x)^4}\right) - Q\left(\varphi - \frac{x^2}{(1-x)^4}\right) \right) dx \quad (17a)$$

This enables calculation of one single, specific table corresponding to the Hilbert relation between $Q(\phi)$ and $\Lambda(\phi)$. Then, the derivation of $L(f)$ in (13) will have a low computational complexity. Since, asymptotically, for a large $\phi$, both $Q(\phi)$ and $\phi\Lambda(\phi)$ are proportional to $\sqrt{\phi}$, the functions must only be tabulated until it is close enough to the asymptote.

Figure 5A:
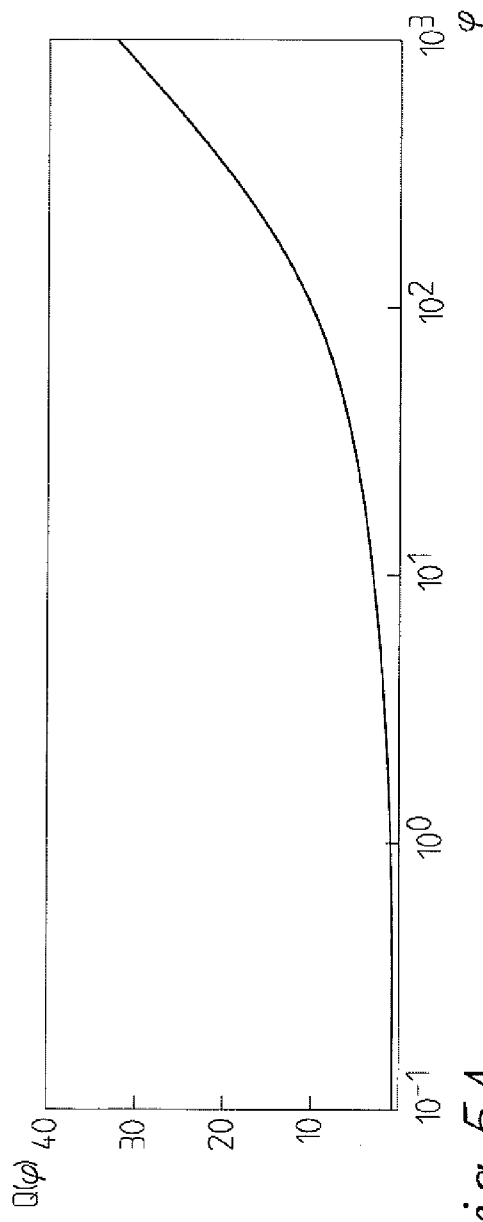
FIG. 5A is a diagram describing the normalized resistance for the BTO model.
Figure 5B:
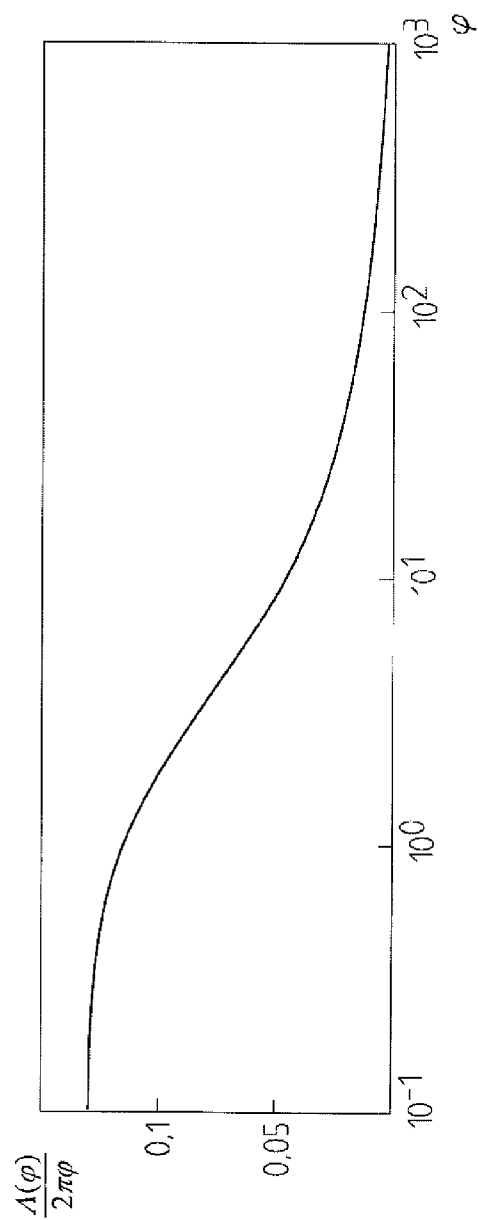
FIG. 5B is a diagram describing the normalized inductance for the BTO model.
Figure 6A:
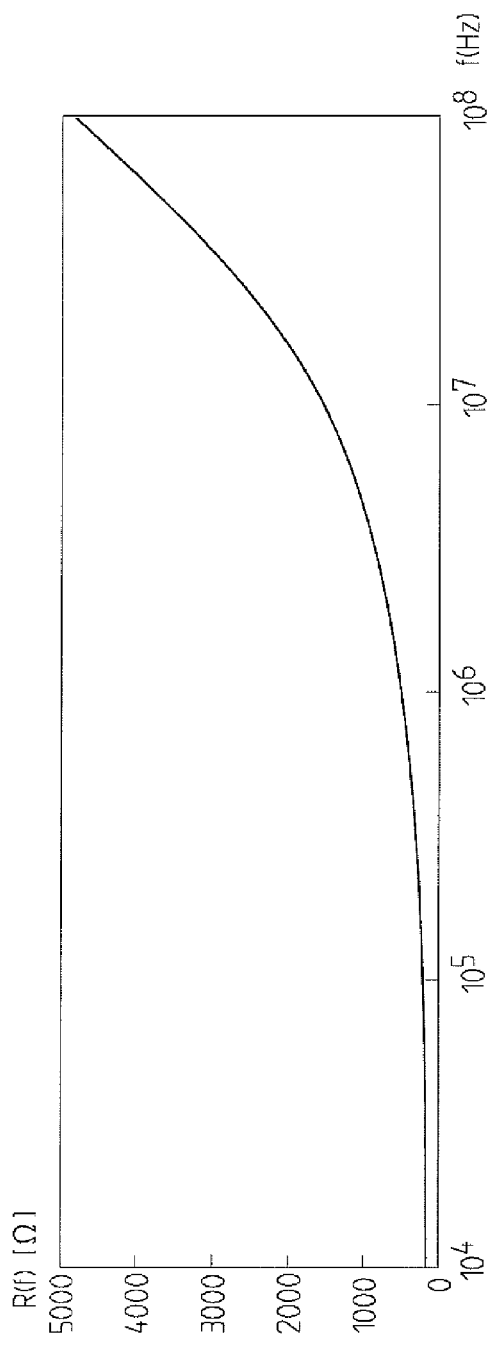
FIG. 6A is a diagram showing the resistance derived for an ETSI 0.5 mm cable model compared to the BTO model.
Figure 6B:
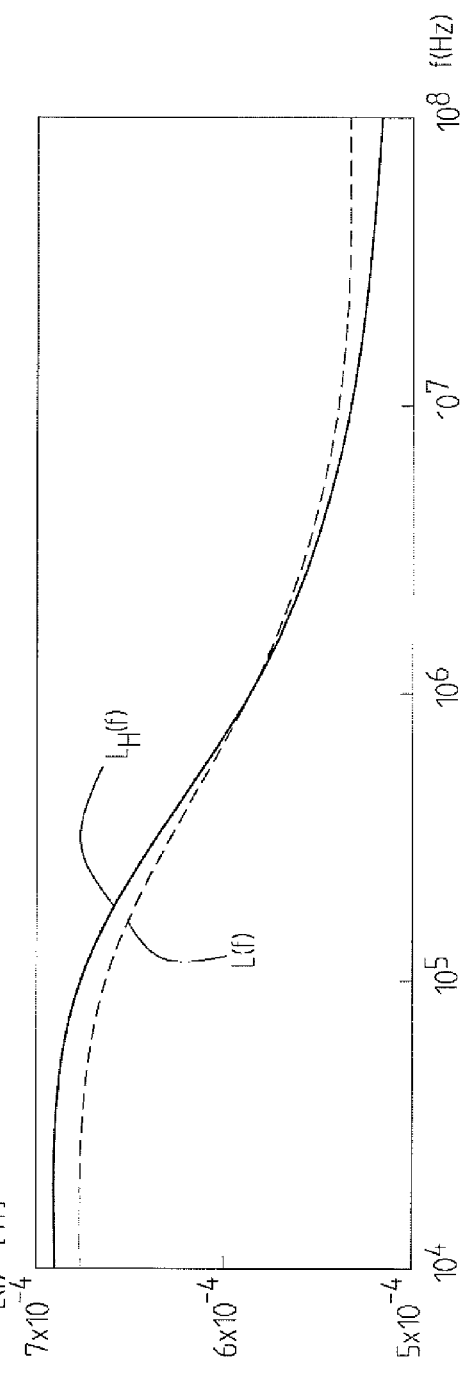
FIG. 6B is a diagram showing the inductance derived for an ETSI 0.5 mm cable model compared to the BTO model.

In FIGS. 5A, 5B the normalized resistance and inductance corresponding to $$Q(\varphi) = \sqrt[4]{1+\varphi^2}$$

are shown. This can, for example, be used to calculate the resistance and inductance for an ETSI 0.5 mm cable model according to (13). With e.g. the parameters $r_{oc}$=179.2, $a_c$=0.0561 and $L_\infty^{(H)}$=5.151·10$^{-4}$ H, the result is shown in FIGS. 6A, 6B.

Figure 8:
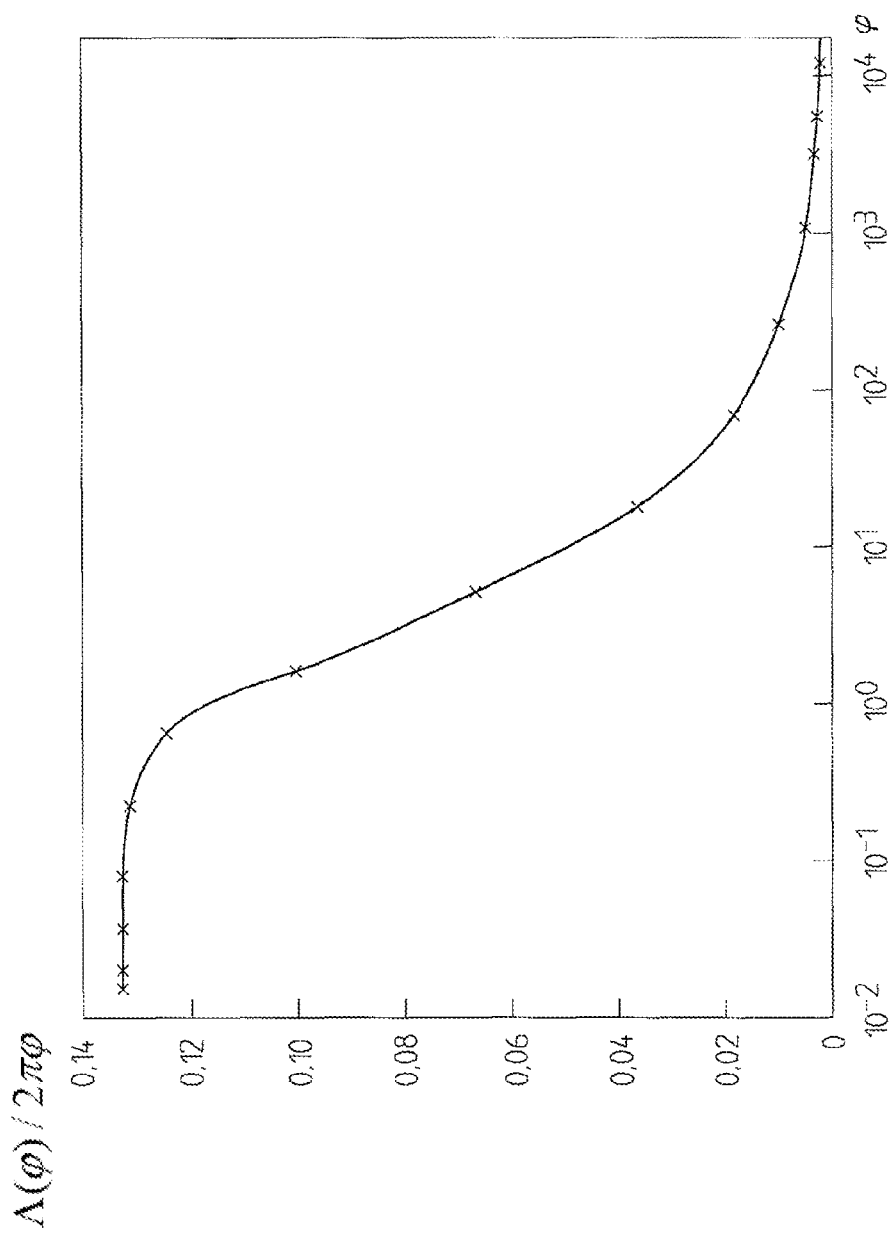
FIG. 8 is an interpolation polynomial as approximation of the Hilbert form.

The table lookup for $\Lambda(\phi)$ can for example be realized with an interpolation polynomial p. Since the normalized inductance is viewed in logarithmic scale of $\phi$ the polynomial should be derived in logarithmic frequency $\beta=\log_{10}(\phi)$. In FIG. 8 16 values of the pairs ($\phi_k$, $\Lambda(\phi_k/2\pi\phi)$) chosen in the interval 1.48·10$^{-4}$≤$\phi$≤1.56·10$^4$ are shown, * indicates interpolation values, full line p($\beta$)/2$\pi\phi$, dashed line $\Lambda(\phi)/2\pi\phi$ (hidden behind full line in the figure). This interval corresponds to a frequency interval including 2 kHz≤f≤500 MHz for most relevant cables. The values are used to form a degree 16 interpolation polynomial p($\beta$) also shown in the figure as p($\beta$)/2$\pi\phi$ together with the true values of $\Lambda(\phi)$, shown as $\Lambda(Q)/2\pi\phi$. Within the interval the error is bounded by $$\frac{|\Lambda(\varphi) - p(\beta)|}{\max(\Lambda(\varphi))} < 0.2\%$$

When the BT0 model is used as a base model for the resistance as above the functions depend only on the normalized frequency $\phi$. However, if a more complex model is used as a base there might be more dimensions in the table. For example, if the VUB0 model is used there is one additional parameter that is due to the proximity effect. In this case two-dimensional tables would be needed for the functions.

Alternatively, according to the first embodiment referred above, the calculation of the inductance $L(f)$ in (13), via the Hilbert transform in (6), can be approximated to an analytical closed-form expression $$L(f) \approx \tilde{L}(f) = \frac{r_{oc} I_0}{2\pi v \cdot \sqrt[4]{1 + \left(\frac{f \cdot I_0^2}{v}\right)^2}} + L_\infty^H \quad (18)$$

wherein $$I_0 = \frac{\Gamma\left(\frac{1}{4}\right)^2}{(\sqrt{2\pi})^3} \approx 0.835$$

is a constant expressed with the Gamma-function.

To make the approximation even more accurate three additional, real-valued scalar, parameters, A, p, and $k_f$ can be introduced to obtain:

$$L(f) \approx \tilde{L}(f) = \frac{A r_{oc} I_0}{2\pi v \cdot \sqrt[4p]{1 + \left(\frac{f \cdot I_0^2}{k_f \cdot v}\right)^{2p}}} + L_\infty^H \quad (19)$$

($\tilde{L}$ does here not correspond to $\tilde{L}$ used earlier (e.g. in equation 2) in the derivation of the Hilbert transform.)

For the special case of A=1, and for frequency zero, f=0, identical inductance values are obtained using closed-form approximation (19) and integral (14). The integral (14) is here considered as a reference.

$$\tilde{L}(0) = L(0) \quad (20)$$

Similarly, when $A \cdot \sqrt{k_f}$=1, the closed-form approximation (15) and integral (14) are asymptotic:

$$\lim_{f \to \infty} \tilde{L}(f) \cdot \sqrt{f} = \lim_{f \to \infty} L(f) \cdot \sqrt{f} = \frac{r_{oc}}{2\pi\sqrt{v}} \quad (21)$$

For the purpose of standardizing a low-order and causal cable model, the additional parameters A, $k_f$, p, can be pre-determined by optimizing some desired criterion, for each considered cable-type, whereupon the parameters define the standardized cable-type together with (17).

If $L_\infty$ is subtracted from the right hand side of equations (18) and (19), and the remainder multiplied by $2\pi f$ and divided by $r_{oc}$, they will approximate the Hilbert transform of Q rather than $L(f)$, i.e.

$$\Lambda(\varphi) \approx \frac{f \cdot I_0}{v \cdot \sqrt[4]{1 + \left(\frac{f \cdot I_0^2}{v}\right)^2}}$$

and $$\Lambda(\varphi) \approx \frac{f \cdot A \cdot I_0}{v \cdot \sqrt[4p]{1 + \left(\frac{f \cdot I_0^2}{k_f \cdot v}\right)^{2p}}}$$

Basically the invention is based on calculating or approximating the Hilbert transform and uses a reformulation of formula (18) above using formula (13) above.

According to different embodiments of the invention, the Hilbert relation between Q(φ) and Λ(φ) can be represented either in a table, or alternatively an analytical, closed-form approximation can be used.

Figure 2:
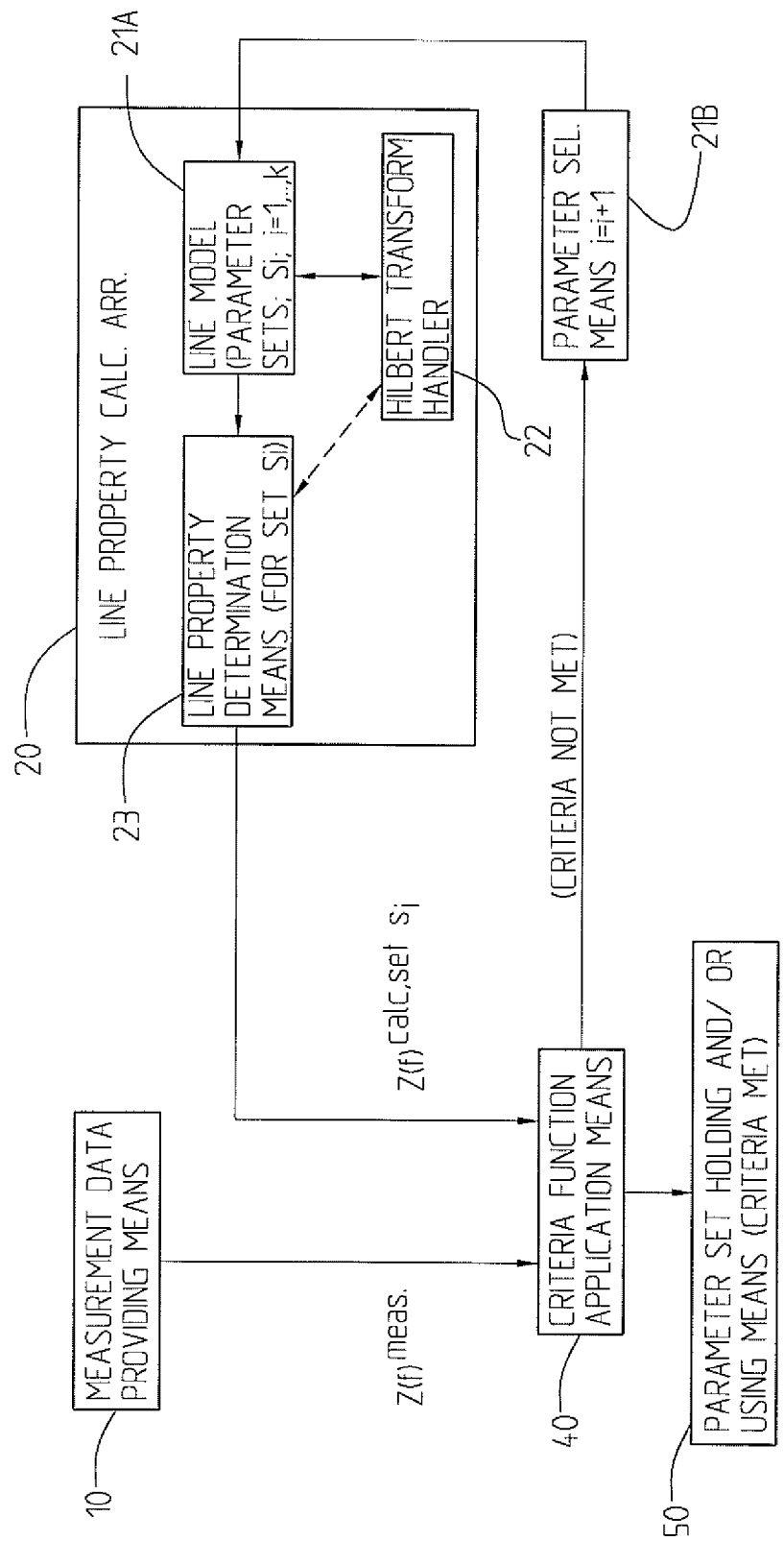
FIG. 2 is a schematical block diagram describing an inventive arrangement for transmission line investigation.

FIG. 2 is a schematical block diagram of an arrangement according to the invention, wherein measurement data providing means 10 somehow acquires measurement data of a property, e.g. Z(f).

In line property calculating means 20 a first set of input parameters are set (estimated) or selected and provided to, or by, parameter selecting means 21B. The set of parameter values may e.g. comprise values of the four parameters referred to earlier in the application, or any relationships between parameters. In line property calculating means 20, comprising means for holding or applying a line model 21B in communication with a Hilbert transform handler 22 and line property determination means 23, for a given set of parameters currently calculated R(f), L(f) are first established by means of the Hilbert transform handler 22. The established parameters (e.g. R,L) are used by line property determination or providing means 23 (also in communication with the Hilbert transform handler 22) to, for the used parameter values, calculate, determine, an impedance $Z(f)^{calc}$ for the given set of parameters. Criteria function 40 comprising one or more criteria to be met, applies said criteria on the $Z(f)^{measure}$ and $Z^{calc}(f)$ which are compared e.g. by means of a Least' Square algorithm or similar to establish if the criteria are met. If not, parameter selecting means 21B are activated to find a new parameter set, i.e. to determine a new input data set to be used by the line property calculating means 20; depending on the outcome of the criteria function application means 40 one or more parameters can be modified, to a larger or smaller extent, increased or decreased, some parameters may be unmodified for the subsequent calculation etc. The "loop" formed by means 40-21B-20 (21A-22-21A-23) proceeds until the given criteria are met. Then the parameters for which the criteria were met are stored in more or less temporary holding means 50, a long term storage, or a cache or directly used for estimation of a desired line property.

Figure 3:
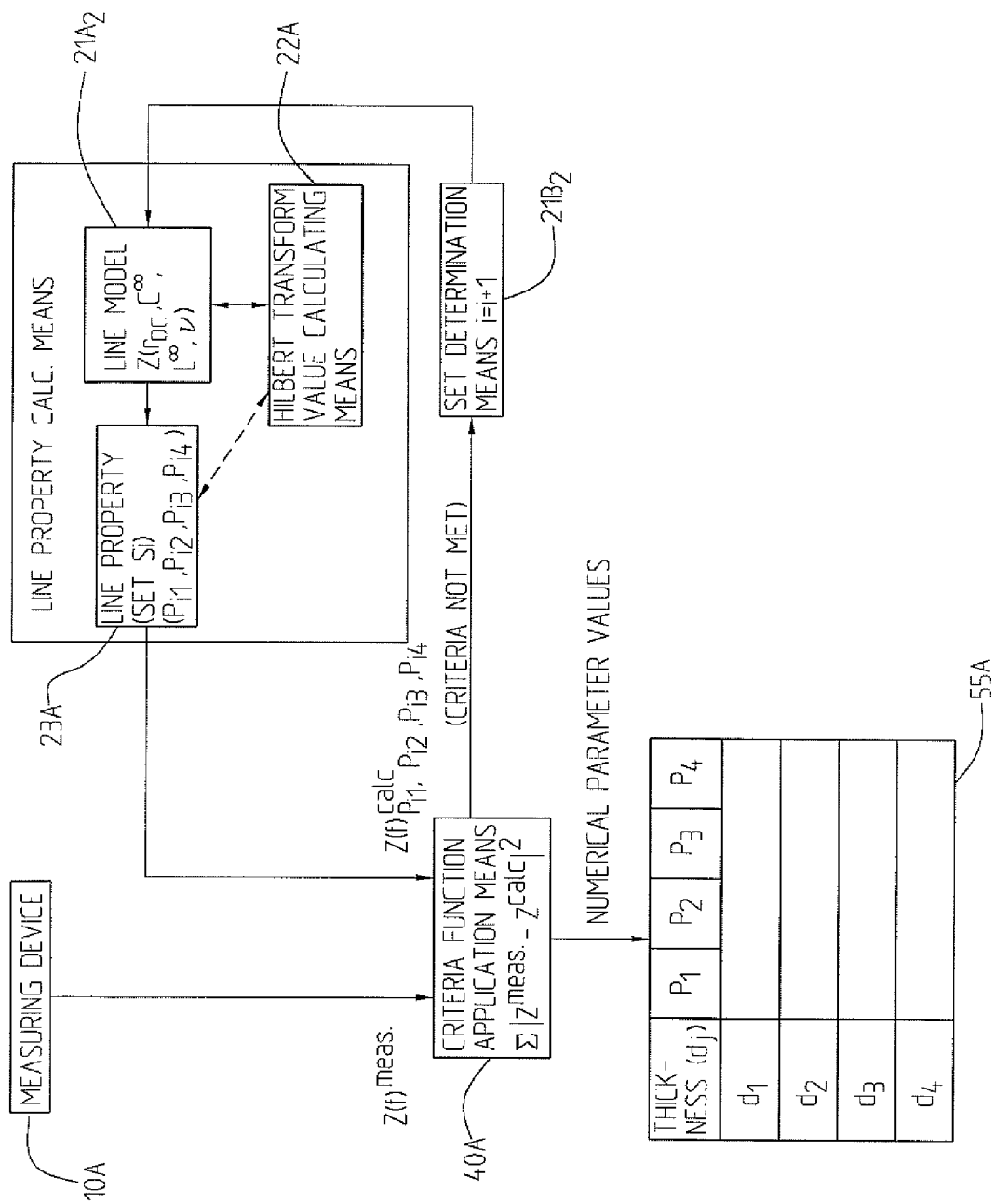
FIG. 3 is a schematical block diagram of a particular embodiment of an arrangement according to the inventive concept.

FIG. 3 shows one particular implementation of the invention, wherein the measurement data providing means comprises a measuring device 10A, e.g. a modem and it is used to measure a property, e.g. $Z_{in}$ as discussed above.

A criteria function application means 40A applies criteria on the measured $Z_{in}$ and different values of the corresponding calculated property, e.g. Z(f) until the criteria are met, wherein the calculation of R,L is performed using the Hilbert transform as discussed more in detail above. Examples on parameters, $r_{oc}$, v, $L_\infty^H$ and $C_\infty$ have also been discussed above.

Line property calculation means comprises Hilbert transform calculating means 22A, line model handler $21A_2$ and line property determination means 23A. It is here supposed that the four model parameters $p_{i1}$, $p_{i2}$, $p_{i3}$, $p_{i4}$ are used, e.g. $r_{oc}$, v, $C^\infty$, $L^\infty$ are used. The optimized values are here stored in a table 55A.

To find the Hilbert relation, either an analytical closed form approximation of L(f) ((18) above), which may be parameterized ((19) above) may be used, or a tabulation is used as described above, e.g. formula (17), by application of a Cauchy principal value method and a variable substitution to enable the provisioning of a one-dimensional table and a numerical solution of the integral. An application, e.g. using a Least Square approach may be used in criteria function application means 40A and found numerical values (of the parameters to be used to give an impedance for which the criteria are met) may in same implementations be stored in a table, 55A for example for different given cable lengths.

A plurality of measurements of different cable dimensions may be carried out to provide a table that can be used if a property of a particular cable is to be found.

As referred to above, the results may also be used directly without storing.

Figure 4:
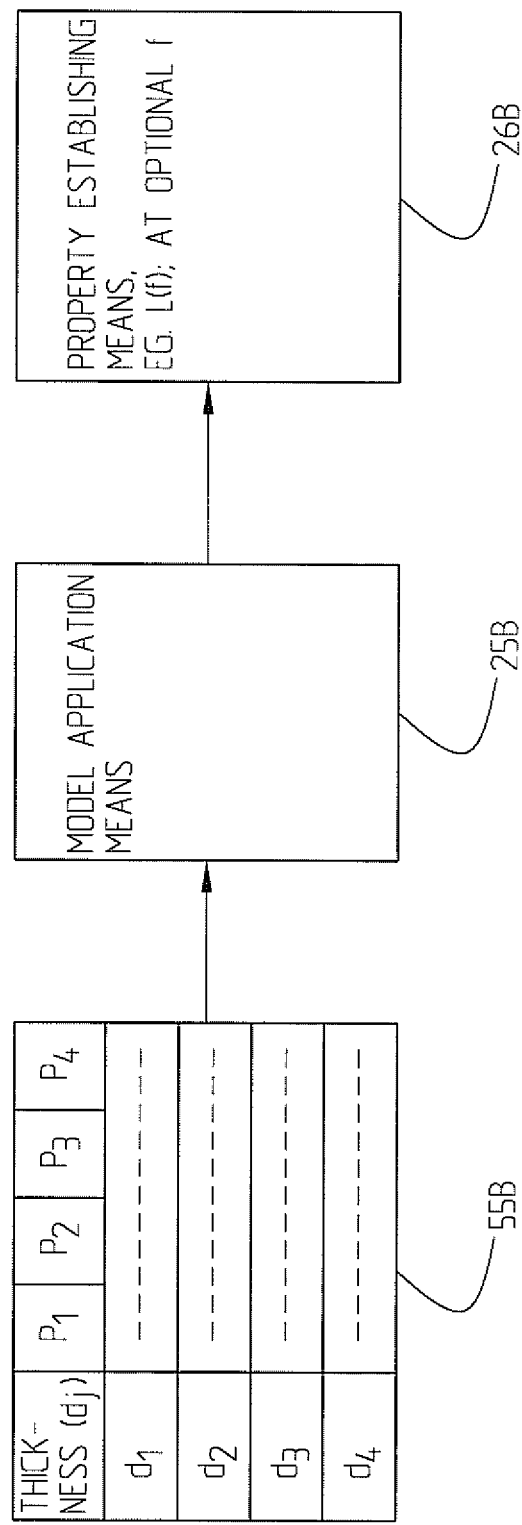
FIG. 4 is a schematical block diagram describing functional means involved in establishing of a property look up table according to the invention.

FIG. 4 schematically shows an application wherein parameter values have been stored in a table 55B. If a cable dimension is selected, the relevant numerical parameter values can be found in the table and input to model executing or application means 256 (e.g. corresponding to line property determination means 23;23A or the line property calculation means 20, wherein the first step does not have to be performed, which, via property establishing means 268 (separate or forming part of the model application means 26A) can deliver a desired property at a desired frequency which can be e.g. much higher, or generally very different, from the frequency at which the measurement had been carried out.

FIG. 5A is a diagram describing the normalized resistance for the BTO model.

FIG. 5B is a diagram describing the normalized inductance for the BTO model.

FIG. 6A is a diagram showing the resistance derived for an ETSI 0.5 mm cable model compared to the BTO model.

FIG. 6B is a diagram showing the inductance derived for an ETSI 0.5 mm cable model compared to the BTO model.

Figure 7:
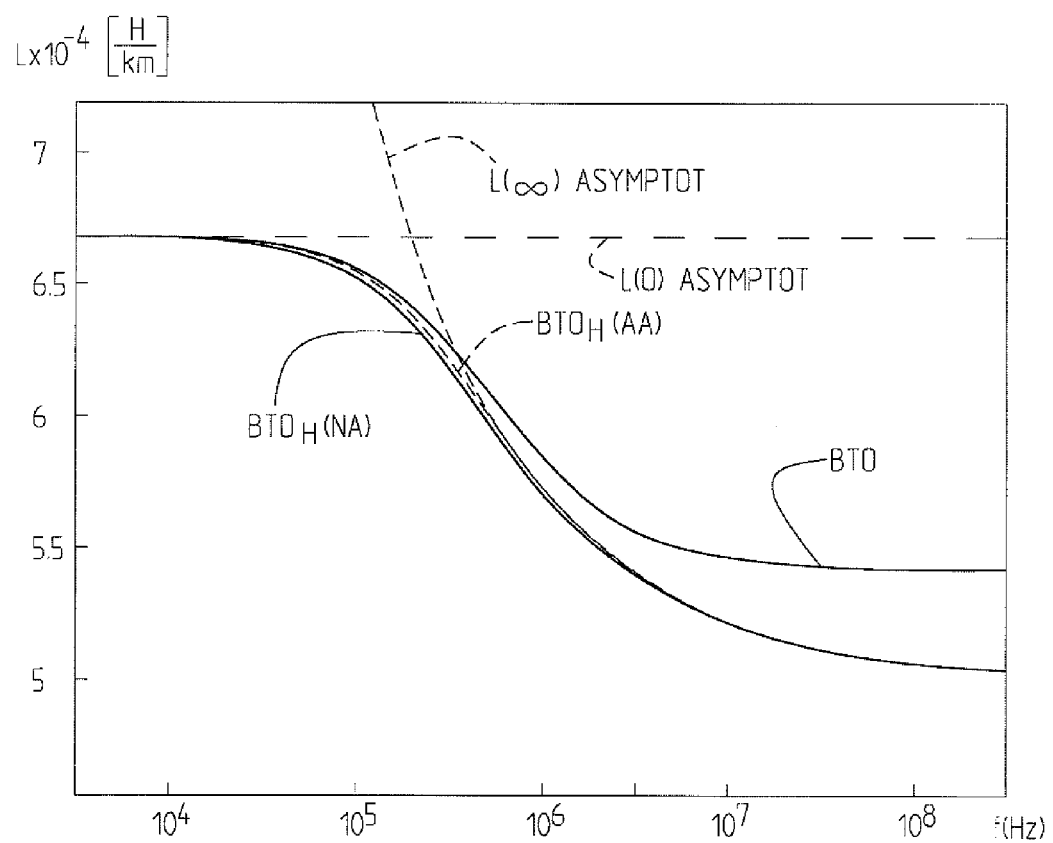
FIG. 7 is a diagram showing the inductance of cable models BTO, $BTO_H$ with a numerical approximation and $BTO_H$ with an analytical approximation.

FIG. 7 is a diagram showing the inductance of cable models BTO, $BTO_H$ with a numerical approximation and $BTO_H$ with an analytical approximation.

FIG. 8 is an interpolation polynomial as approximation of the Hilbert form.

Figure 9A:
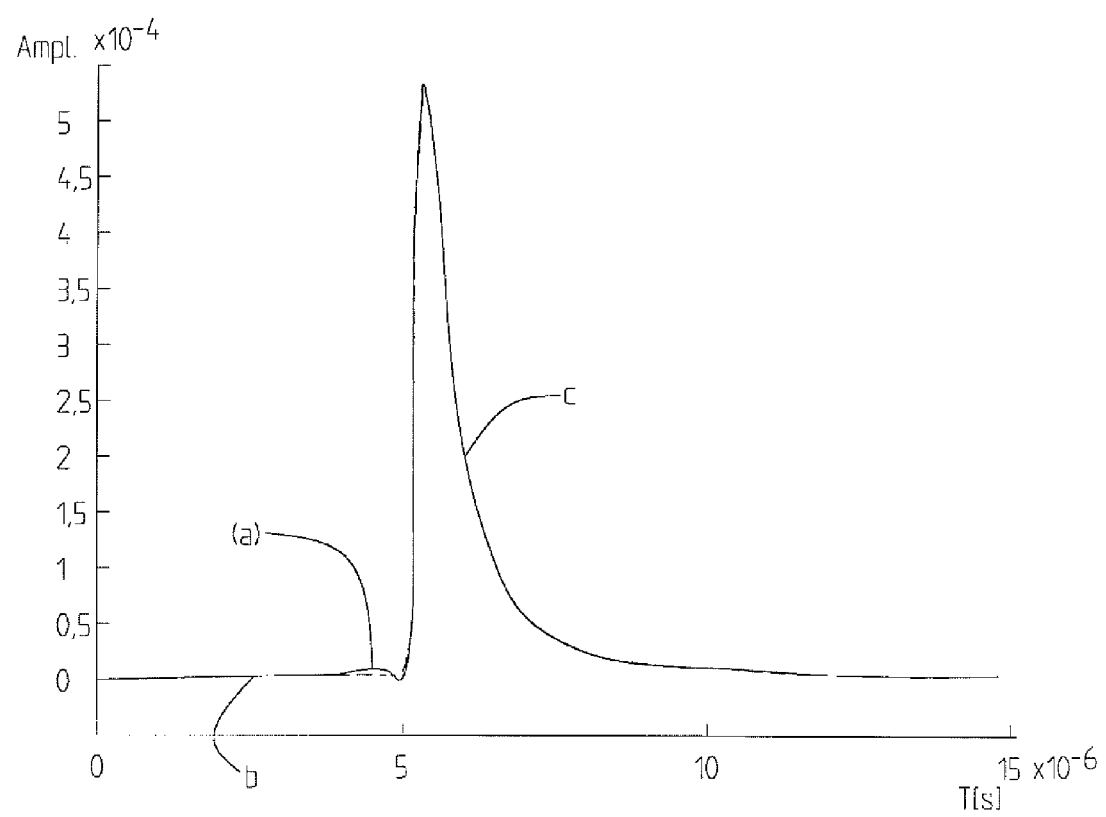
FIG. 9A is a diagram illustrating the impulse response of a 1 km cable model wherein the inductance is computed according to a) BTO, $BTO_H$ which analytical approximation and c) $BTO_H$ with numerical approximation.

FIG. 9A shows the impulse response of a 1 km cable model with the inductance computed according to: BT0(a), $BT0_H$ with analytical approximation (b), A=1, $k_f$=0.9, p=0.87, and $BT0_H$ with numerical approximation (c).

Figure 9B:
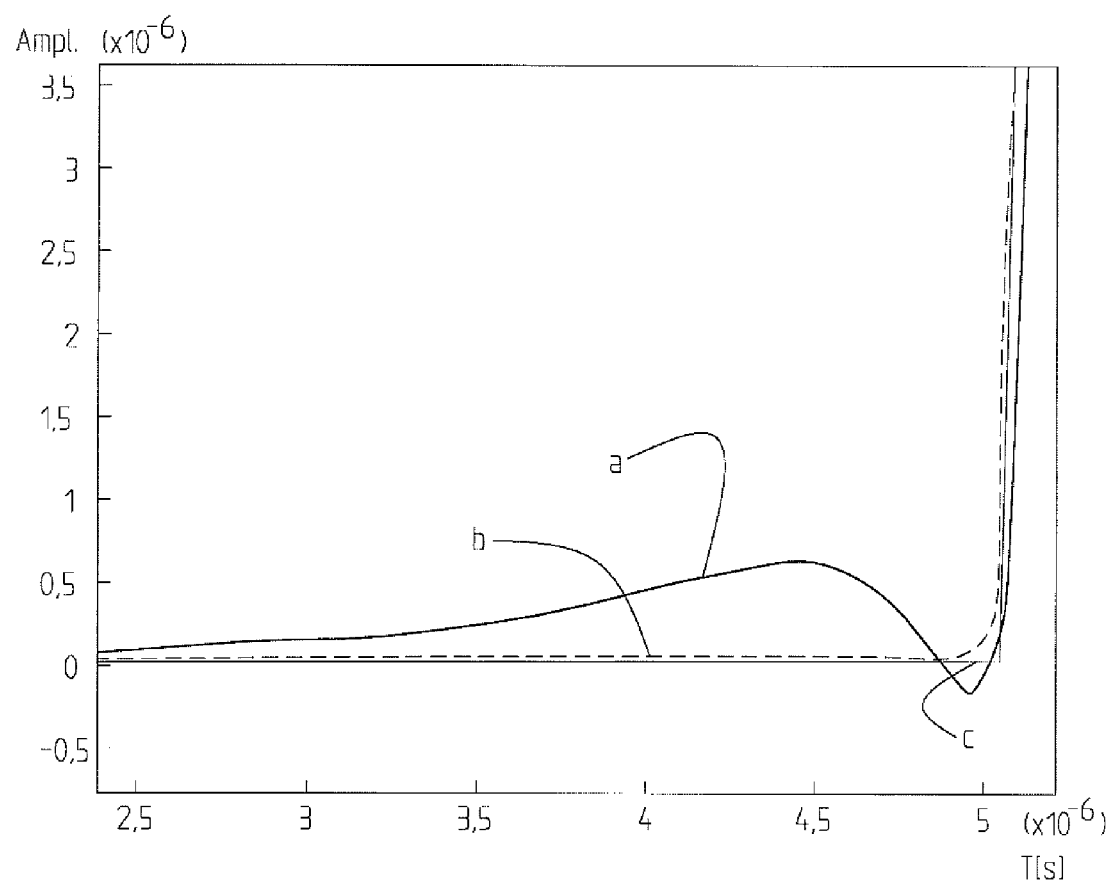
FIG. 9B is an enlarged view of the impulse response shortly before the theoretical minimum delay time.

In FIG. 9B, showing the same curves as in FIG. 9A, the area before the theoretical minimum delay time, which is about $5\times10^{-6}$ s is magnified for a 1 km, 0.5 mm ETSI cable.

In a particular aspect of the invention, it can be said to comprise a method of analysing a transmission line cable comprising the steps of: computing a parameter φ as f/v where f is a first frequency of interest, and v represents a frequency with the property that for frequencies substantially higher than v, the resistance of a transmission line varies with frequency as essentially the square root of the frequency, and for frequencies substantially lower than v, the resistance of the line is essentially constant; querying with φ as input a one-dimensional representation R which produces as response to the query a value Λ, wherein Λ is an approximation of the Hilbert transform of a function Q which describes the dependence with frequency of the resistance of the transmission line; and estimating a transmission property of the transmission line or setting an operational parameter of the transmission line in dependence of Λ. R is a table lookup function. or, according to other implementations a mathematical expression, e.g.

$$\varphi l_o / \sqrt[4]{1+(\varphi l_o^2)^2}.$$

Figure 10:
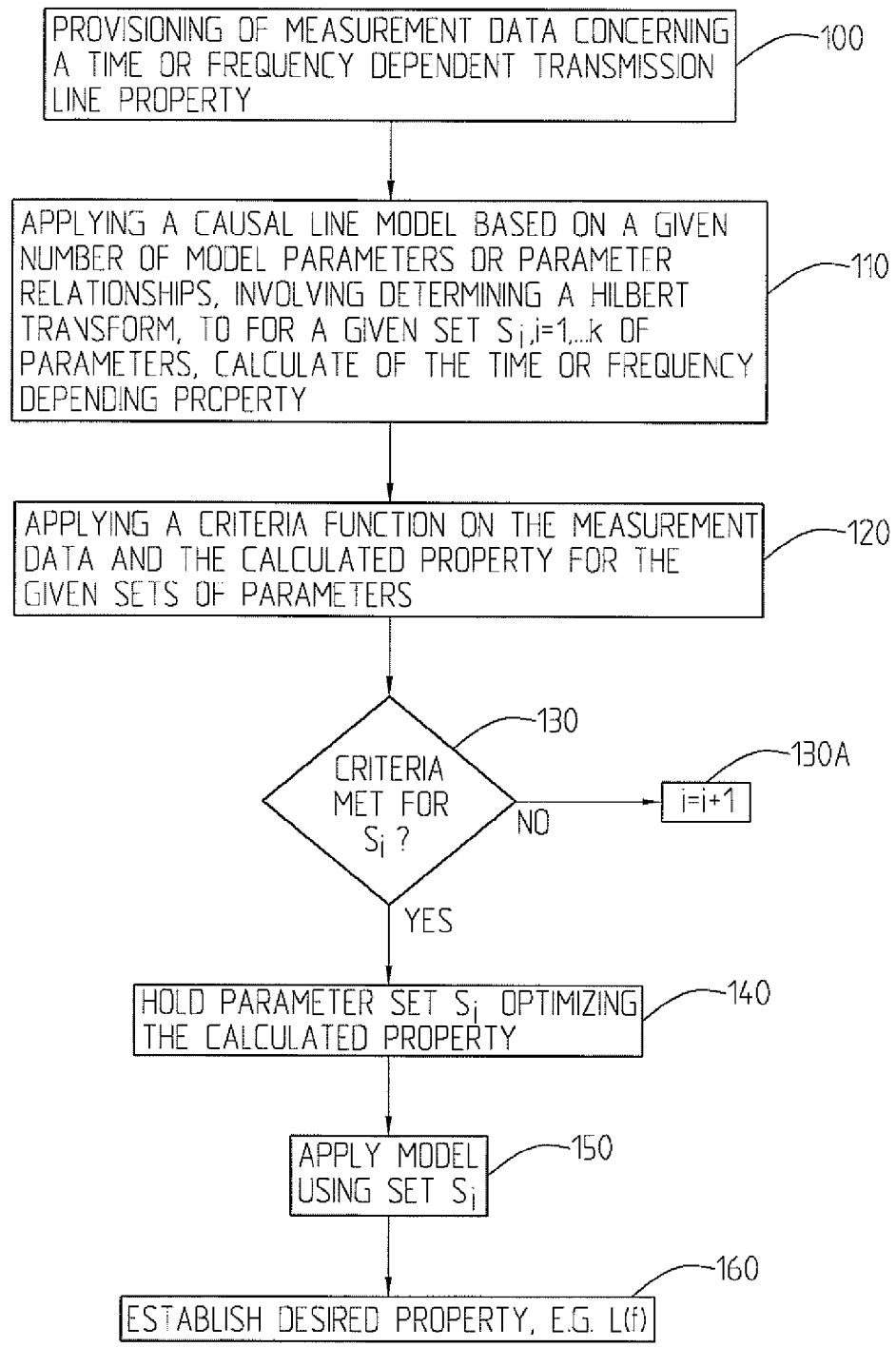
FIG. 10 is a schematical flow diagram describing the procedure for finding parameter values, and prediction of a property.

FIG. 10 is a schematical flow diagram describing the procedure according to the invention. First it is supposed that measurement data is acquired concerning a time or frequency dependent transmission line property, 100. The measurement data may be provided by actually performing measurements during a time interval, or for a plurality of frequencies, or by fetching or receiving the data from some external equipment. A causal line model is then applied on a given number of model parameters (or relationships between parameters), involving determining the Hilbert transform or relation as discussed earlier in the application, to calculate the (a first) time or frequency depending property for a given set of parameters (or relationships), here called set $S_i$, 120.

If the given criteria are met (there may be one or more; e.g. a LS approach is used), 130, the parameters of the set for which the criteria were met may be stored, e.g. cached, 140, and the line model applied based on the found parameter set $S_i$, 150. A desired property e.g. L(f), may then be established, for an arbitrary frequency/time, e.g. other than the time/frequency involved in the measurement data, 160. Other properties than L(f) may of course also or alternatively be established.

If, on the other hand, the criteria were not met for set $S_i$ (130) the parameters are adjusted to provide a better match between measured and calculated first property, here being illustrated merely performing steps 110, 120, 130 for set i+1, 130A. It should be clear that finding a new parameter set to be used and matched, i.e. the calculated property versus the measured property, involves determination as to whether the parameters are to be increased/decreased, which parameters are to be adjusted etc.

Figure 11:
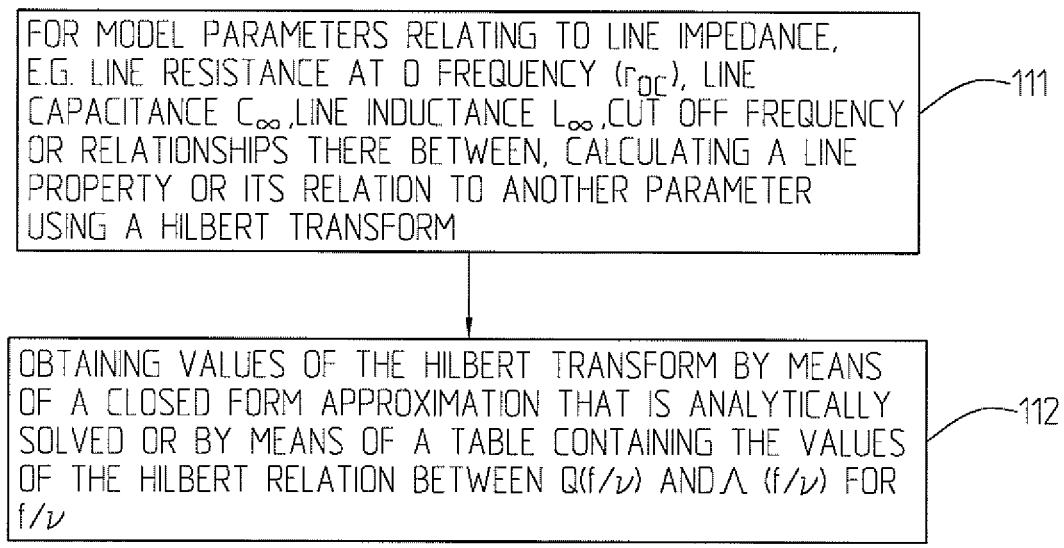
FIG. 11 is a simplified flow diagram describing a detail in the procedure of finding the optimized parameter values.

FIG. 11 briefly illustrates steps taken in step 110 of FIG. 10. If the model parameters relate to line impedance, and e.g. consist of the line resistance at zero frequency ($r_{oc}$), line capacitance ($C_\infty$), line inductance ($L_\infty$), cut off frequency v (or any relationships therebetween) a line property, a model parameter, or its relation to another parameter is calculated using a Hilbert transform (111).

The values of the Hilbert transform are obtained by means of a closed form approximation that is analytically solved, or by means of a table containing the values of the Hilbert relation between Q(f/v) and Λ(f/v) for f/v, 112, as more thoroughly discussed earlier in the application.

It is an advantage of the invention that a causal model is provided which is robust, and does not require extensive numerical computations.

Moreover, the optimized parameters of the $BT0_H$, model provide insertion loss estimates within ±2% compared to the BT0 model. The impulse response for each cable model has been studied for the both models and it can be concluded that use of the $BT0_H$ model as described herein provides a causal and considerably improved time-domain behavior in contrast to BT0.

In advantageous applications an estimate of the inductance is provided, although the invention is not limited thereto, also other properties can be analyzed or estimated. The invention is also in other respects not limited to the specifically illustrated embodiments, but can be varied within the scope of the appended claims. The cable model can be used for a large number of different applications and for estimating or examining different cable types and different properties.

The invention claimed is:

1. An arrangement for analyzing or predicting one or more transmission line properties, comprising:
   a measurement data providing means for providing measurement data of a first time or frequency dependent property of a transmission line,
   a transmission line property calculation arrangement, which comprises a transmission line model handling means providing a transmission line model, a Hilbert transform handler and line property determination means, and which is arranged to provide a calculation of the said first property based on a number of model parameters, wherein
   the model parameters comprise or are related to at least two of the transmission line properties or quantities, a line resistance at 0 frequency, $r_{oc}$, a cut-off frequency, v, a line capacitance, $C_\infty$, and a line inductance, $L_\infty^H$, or one or more relationships therebetween, wherein the line model handling means are adapted to calculate the transmission line inductance L(f), or an expression including the inductance L(f), using a Hilbert transform of a function of Q(f/v), wherein said function Q(f/v) relates the line resistance R(f) to $r_{oc}$ as R(f)=$r_{oc}$·Q(f/v), wherein said $$Q(f/v) = \sqrt[4]{1+\left(\frac{x}{v}\right)^2},$$

wherein the Hilbert transform of Q(f/v) is defined by $$\Lambda\left(\frac{f}{v}\right) = -\frac{1}{\pi} \cdot \int_{-\infty}^{\infty} \frac{\sqrt[4]{1+\left(\frac{x}{v}\right)^2}}{f-x} dx,$$

wherein f is line frequency, and x denotes an integration variable that spans a frequency range, and wherein values of the Hilbert transform are calculated using an analytical closed form expression or wherein alternatively values of the Hilbert transform are tabulated or approximated by a polynomial, and in that, for model parameter values calculated by means of the line model handling means in communication with the Hilbert transform handler, the line property determination means are adapted to calculate the first property, that further criteria function application means being in communication with the line property determination means and the measurement data providing means are arranged to, using the measured first property and the calculated first property for a given set of model parameters, find optimized numerical model parameter values for which one or more given criteria are met.

2. The arrangement according to claim 1, wherein the analytical closed form expression is:

$$\frac{f}{v} \cdot \frac{I_0}{\sqrt[4]{1+\left(\frac{f \cdot I_0^2}{v}\right)^2}}$$

wherein $I_0$ is a constant and f is line frequency.

3. The arrangement according to claim 1, wherein the numerical model parameter values are obtained for a given first dimension, the length of a transmission line and for a given second dimension of the transmission line.

4. The arrangement according to claim 1, wherein the transmission line model is causal.

5. The arrangement according to claim 2, wherein the line model handling means in communication with the Hilbert transform handler are adapted to use additional real valued scalar parameters (A, p, $K_f$) in an expression for calculation of the line inductance or an expression including the line inductance, defined by:

$$L(f) \approx \tilde{L}(f) = \frac{Ar_{oc}I_0}{2\pi v \cdot \sqrt[4p]{1 + \left(\frac{f \cdot I_0^2}{k_f \cdot v}\right)^{2p}}} + L_\infty^H$$

wherein A, p and $K_f$ are real-valued scalar parameters.

6. The arrangement according to claim 1, wherein the first measured property is a line impedance Z(f;t).

7. The arrangement according to claim 6, wherein the measurement data providing means comprises a data receiving or requesting means or a measuring device.

8. The arrangement according to claim 1, wherein the first measured property is related to a transfer function or a scattering parameter or a damping function (A(f;t)).

9. The arrangement according to claim 1, wherein the measurement data providing means comprise or are associated with means for transmitting a probing signal into the transmission line and means for receiving a signal being a reflected echo signal of the transmitted signal the first property being measured using the echo signal of a transmission line segment.

10. The arrangement according to claim 1, wherein it is arranged to comprise or to communicate with at least one of a parameter set value holding means and a table wherein, for at least one given transmission line length and dimension, for which a measured first property is established, the found, optimized numerical parameter values are at least one of held and used.

11. The arrangement according to claim 1, wherein the line property calculation means comprises or are adapted to, for input numerical parameter values, generate one or more transmission line properties of a transmission line, said properties comprising one or more of Z(f), R(f), L(f), C(f), wherein Z(f) is frequency dependent impedance, wherein C(f) is frequency dependent capacitance, wherein f is line frequency, and wherein property information can be obtained for a desired frequency/time independently of in which frequency/interval or points in time the first property measurement was performed.

12. The arrangement according to claim 1, wherein the line model handling means are arranged to express line resistance R(f) as $$R(f) = r_{oc} \cdot \sqrt[4]{1 + \left(\frac{f}{v}\right)^2} = r_{oc} \cdot Q\left(\frac{f}{v}\right),$$

express line inductance L(f) using a Hilbert transform as $$L(f) = \frac{r_{oc}}{2\pi f} \cdot \Lambda\left(\frac{f}{v}\right) + L_\infty^H, \text{ where } \Lambda\left(\frac{f}{v}\right)$$

where $$\Lambda\left(\frac{f}{v}\right)$$

is the Hilbert transform of $$Q\left(\frac{f}{v}\right),$$

such that $$\Lambda\left(\frac{f}{v}\right) = -\frac{1}{\pi} \cdot \int_{-\infty}^{\infty} \frac{\sqrt[4]{1 + \left(\frac{x}{v}\right)^2}}{f - x} dx,$$

is written as $$\Lambda(\varphi) = -\frac{1}{\pi} \cdot \int_{-\infty}^{\infty} \frac{Q(\vartheta)}{\varphi - \vartheta} d\vartheta,$$

φ being f/v, and to use numerical values obtainable by application of a Cauchy principal value method, giving $$\Lambda(\varphi) = \frac{1}{\pi} \int_{0^+}^{\infty} \frac{Q(\varphi + \vartheta) - Q(\varphi - \vartheta)}{\vartheta} d\vartheta,$$

, and a change of variables giving a finite integral with a finite integrand, wherein f is line frequency, wherein x denotes an integration variable that spans a frequency range, wherein $$Q(\vartheta) = \sqrt[4]{1 + (\vartheta)^2},$$

and wherein $$\theta = \frac{x}{v}.$$

13. The arrangement according to claim 12, wherein a single specific table corresponding to the Hilbert relation between Q(φ) and Λ(φ) is calculated, wherein Q( ) is $$Q(\varphi) = \sqrt[4]{1 + (\varphi)^2}.$$

14. Use of an arrangement as in claim 1 for analyzing or predicting a property comprising or including the line inductance L(f).

15. A method for analyzing or predicting one or more transmission line properties, the method implemented in an arrangement comprising the steps of:
  acquiring measurement data relating to a first frequency or time dependent property of a transmission line,
  expressing the measured quantity using a causal model as a function of a number of model parameters,
  finding optimized numerical values of the model parameters or the relationships therebetween based on one or more given criteria, wherein
the model parameters comprise one or more parameters, or relationships therebetween, related to a line resistance at 0 frequency, $r_{oc}$, a cut-off frequency, v, a line capacitance, $C_\infty$, a line inductance $L_\infty^H$; and in that the calculation of a transmission line property comprises:

calculating the transmission line inductance L(f) or an expression including said inductance, via a Hilbert transform defined by, $$\Lambda\left(\frac{f}{v}\right) = -\frac{1}{\pi} \cdot \int_{-\infty}^{\infty} \frac{\sqrt[4]{1+\left(\frac{x}{v}\right)^2}}{f-x} dx$$

wherein f is line frequency, wherein x denotes an integration variable that spans a frequency range, and wherein the values of said Hilbert transform are calculated using an analytical closed-form expression for the Hilbert transform, or wherein the values of the Hilbert relation between Q(φ) and Λ(φ) or between line resistance and line inductance are fetched from a table wherein said values are held in dependence on f/v or said values are computed by a polynomial in log f/v, wherein Q(φ) is $$Q(\varphi) = \sqrt[4]{1+(\varphi)^2},$$

and wherein Λ(φ) is $$\Lambda(\varphi) = -\frac{1}{\pi} \cdot \int_{-\infty}^{\infty} \frac{Q(\vartheta)}{\varphi - \vartheta} d\vartheta.$$

16. A method according to claim 15, comprising the step of as analytical closed form expression, using:

$$\frac{f}{v} \cdot \frac{I_0}{\sqrt[4]{1+\left(\frac{f \cdot I_0^2}{v}\right)^2}}$$

wherein $I_0$ is a constant, and wherein f is line frequency.

17. A method as in claim 16, comprising the steps of:

using additional real valued scalar parameters A, p, $k_f$ in the calculation, comprising an approximation, of the line inductance, the Hilbert transform defined by $$\Lambda(\varphi) \approx \frac{f \cdot A \cdot I_0}{v \cdot \sqrt[4p]{1+\left(\frac{f \cdot I_0^2}{k_f \cdot v}\right)^{2p}}}.$$

wherein A, p and $k_f$ are real-valued scalar parameters.

18. A method as in claim 16 wherein the first measured property is the line impedance $Z_{in}$ a scattering parameter S and in that the measurement data acquiring step comprises:

measuring the impedance Z(f) or Z(t) or scattering parameter S(f) or S(t), wherein Z(f) is frequency dependent impedance, wherein Z(t) is time dependent impedance, wherein S(f) is frequency dependent scattering parameter, and wherein S(t) is time dependent scattering parameter, or fetching the measurement data from an external or separate measuring device.

19. A method as in claim 16, comprising the steps of:

for a calculated property comprising at least one of a given length and thickness of at least one given transmission line, holding the optimized calculated parameter values, in a table, or temporarily or substantially direct use, in a cache.

20. A method as n claim 19, comprising the steps of:

selecting transmission line dimension, finding, depending on the selection, numerical parameter values corresponding to the given transmission line in a table, providing the found numerical parameter values to the line property calculating means, receiving, from the line property calculating means, information about the desired property, receiving or obtaining, for an arbitrary, selected frequency, information of one or more line properties independently of at which frequency/interval points in time the first property was measured.

21. A method of estimating or investigating of a transmission line property based on measurement of a first frequency or time dependent transmission line property, the method implemented in an arrangement comprising the steps of:

estimating a transmission line property using a causal transmission line model based on a number of model parameters, or relationships between model parameters wherein line resistance R(f) is written as:

$$R(f) = r_{oc} \cdot \sqrt[4]{1+\left(\frac{f}{v}\right)^2} = r_{oc} \cdot Q\left(\frac{f}{v}\right)$$

wherein f is line frequency, wherein $r_{oc}$ line resistance at 0 frequency, wherein v is a cut-off frequency, wherein said $$Q(f/v) = \sqrt[4]{1+\left(\frac{x}{v}\right)^2},$$

whereby $$v = \left(\frac{r_{oc}^4}{a_c}\right)^{1/2},$$

$a_c$ being a constant, and wherein line inductance is expressed as $$L(f) = \frac{r_{oc}}{2\pi f} \cdot \Lambda\left(\frac{f}{v}\right) + L_\infty^H, \Lambda\left(\frac{f}{v}\right)$$

being the Hilbert transform of $$Q\left(\frac{f}{v}\right),$$

as follows $$\Lambda\left(\frac{f}{v}\right) = -\frac{1}{\pi} \cdot \int_{-\infty}^{\infty} \frac{\sqrt[4]{1+\left(\frac{x}{v}\right)^2}}{f-x} dx$$

wherein x denotes an integration variable that spans a frequency range, and further comprising the step of:
  using numerical values obtainable by application of a Cauchy principal value method on $$\Lambda(\varphi) = -\frac{1}{\pi} \cdot \int_{-\infty}^{\infty} \frac{Q(\vartheta)}{\varphi - \vartheta} d\vartheta, \text{ giving}$$

$$\Lambda(\varphi) = \frac{1}{\pi} \int_{0^+}^{\infty} \frac{Q(\varphi + \vartheta) - Q(\varphi - \vartheta)}{\vartheta} d\vartheta$$

wherein $\varphi = f/v$, and a change of variables reformulating the integral to a finite integral with a finite integrand, and hence calculating one table corresponding to the Hilbert transform between $Q(\varphi)$ and $\Lambda(\varphi)$, wherein $Q(\varphi)$ is $$Q(\varphi) = \sqrt[4]{1+(\varphi)^2}.$$

* * * * *

UNITED STATES PATENT AND TRADEMARK OFFICE
CERTIFICATE OF CORRECTION

PATENT NO. : 9,009,017 B2  Page 1 of 4
APPLICATION NO. : 13/504993
DATED : April 14, 2015
INVENTOR(S) : Fertner et al.

It is certified that error appears in the above-identified patent and that said Letters Patent is hereby corrected as shown below:

On the Title page (57), under "ABSTRACT", in Column 2, Line 5, delete "Hubert" and insert -- Hilbert --, therefor.

(57), under "ABSTRACT", in Column 2, Line 10, delete "Hubert" and insert -- Hilbert --, therefor.

(57), under "ABSTRACT", in Column 2, Line 14, delete "Hubert" and insert -- Hilbert --, therefor.

On Page 2, (56), under "OTHER PUBLICATIONS", in Column 2, Line 6, delete "Acces" and insert -- Access --, therefor.

On Page 2, (56), under "OTHER PUBLICATIONS", in Column 2, Line 15, delete "Amsterdamn." and insert -- Amsterdam. --, therefor.

In the Drawings

In Fig. 10, Sheet 11 of 12, delete "
```
APPLYING A CAUSAL LINE MODEL
NUMBER OF MODEL PARAMETERS
RELATIONSHIPS, INVOLVING DETER
TRANSFORM, TO FOR A GIVEN SE
PARAMETERS, CALCULATE OF TH
DEPENDING PRCPERTY
```
" and insert --
```
APPLYING A CAUSAL LINE MODEL
NUMBER OF MODEL PARAMETERS
RELATIONSHIPS, INVOLVING DETER
TRANSFORM, TO FOR A GIVEN SE
PARAMETERS, CALCULATE OF TH
DEPENDING PROPERTY
```
--, therefor.

Signed and Sealed this
First Day of March, 2016

Michelle K. Lee
*Director of the United States Patent and Trademark Office*

CERTIFICATE OF CORRECTION (continued)
U.S. Pat. No. 9,009,017 B2

In the Specification

In Column 2, Line 17, delete "BTO$_H$" and insert -- BT0$_H$ --, therefor.

In Column 5, Line 18, delete "BTO" and insert -- BT0 --, therefor.

In Column 5, Line 20, delete "BTO" and insert -- BT0 --, therefor.

In Column 5, Line 22, delete "BTO" and insert -- BT0 --, therefor.

In Column 5, Line 24, delete "BTO" and insert -- BT0 --, therefor.

In Column 5, Line 26, delete "BTO, BTOH with a numerical approximation and BTOH" and insert -- BT0, BT0H with a numerical approximation and BT0H --, therefor.

In Column 5, Line 32, delete "BTO, BTOH" and insert -- BT0, BT0H --, therefor.

In Column 5, Line 33, delete "BTOH" and insert -- BT0H --, therefor.

In Column 7, Lines 36-38, delete "$\gamma = \sqrt{(R+jwL)(G+jwC)}$ $Z_0 = \sqrt{\frac{R+jwL}{G+jwC}}$" and insert -- $\gamma = \sqrt{(R+j\omega L)(G+j\omega C)}$ $Z_0 = \sqrt{\frac{R+j\omega L}{G+j\omega C}}$ --, therefor.

In Column 7, Line 49, delete "BTO" and insert -- BT0 --, therefor.

In Column 13, Line 27, delete "Zcalc(f)" and insert -- Zcalc(f), --, therefor.

In Column 13, Line 48, delete "R,L" and insert -- R, L --, therefor.

In Column 14, Line 12, delete "256 (e.g." and insert -- 25B e.g. --, therefor.

In Column 14, Line 16, delete "268" and insert -- 26B --, therefor.

In Column 14, Line 22, delete "BTO" and insert -- BT0 --, therefor.

In Column 14, Line 23, delete "FIG. 58" and insert -- FIG.5B --, therefor.

CERTIFICATE OF CORRECTION (continued)
U.S. Pat. No. 9,009,017 B2

In the Specification

In Column 14, Line 24, delete "BTO" and insert -- BT0 --, therefor.

In Column 14, Line 26, delete "BTO" and insert -- BT0 --, therefor.

In Column 14, Line 28, delete "BTO" and insert -- BT0 --, therefor.

In Column 14, Line 30, delete "BTO, BTOH with a numerical approximation and BTOH" and insert -- BT0, BT0H with a numerical approximation and BT0H --, therefor.

In Column 14, Line 56, delete "function." and insert -- function, --, therefor.

In the Claims

In Column 17, Line 23, in Claim 9, delete "signal" and insert -- signal; --, therefor.

In Column 17, Lines 57-58, in Claim 12, delete "$L(f) = \frac{r_{oc}}{2\pi f} \cdot \Lambda\left(\frac{f}{v}\right) + L_\infty^H, \text{ where } \Lambda\left(\frac{f}{v}\right)$" and insert -- $L(f) = \frac{r_{oc}}{2\pi f} \cdot \Lambda\left(\frac{f}{v}\right) + L_\infty^H,$ --, therefor.

In Column 18, Line 30, in Claim 12, delete ", and" and insert -- and --, therefor.

In Column 18, Line 47, in Claim 13, delete "Q( )" and insert -- Q($\varphi$) --, therefor.

In Column 19, Line 35, in Claim 16, delete "step of" and insert -- step of, --, therefor.

In Column 19, Lines 52-55, in Claim 17, delete "$\Lambda(\varphi) \approx \frac{f \cdot A \cdot I_0}{v \cdot 4p\sqrt{1 + \left(\frac{f \cdot I_0^2}{k_f \cdot v}\right)^{2p}}}$" and insert -- $\Lambda(\varphi) \approx \frac{f \cdot A \cdot I_0}{v \cdot 4p\sqrt{1 + (\frac{f \cdot I_0^2}{k_f \cdot v})^{2p}}}$ --, therefor.

In Column 19, Line 60, in Claim 18, delete "Zin" and insert -- Zin or --, therefor.

CERTIFICATE OF CORRECTION (continued)
U.S. Pat. No. 9,009,017 B2

In the Claims

In Column 20, Line 8, in Claim 19, delete "temporarily or" and insert -- temporarily for --, therefor.

In Column 20, Line 10, in Claim 20, delete "n claim" and insert -- in claim --, therefor.

In Column 20, Line 39, in Claim 21, delete "roc" and insert -- roc is --, therefor.